Patented Nov. 16, 1943

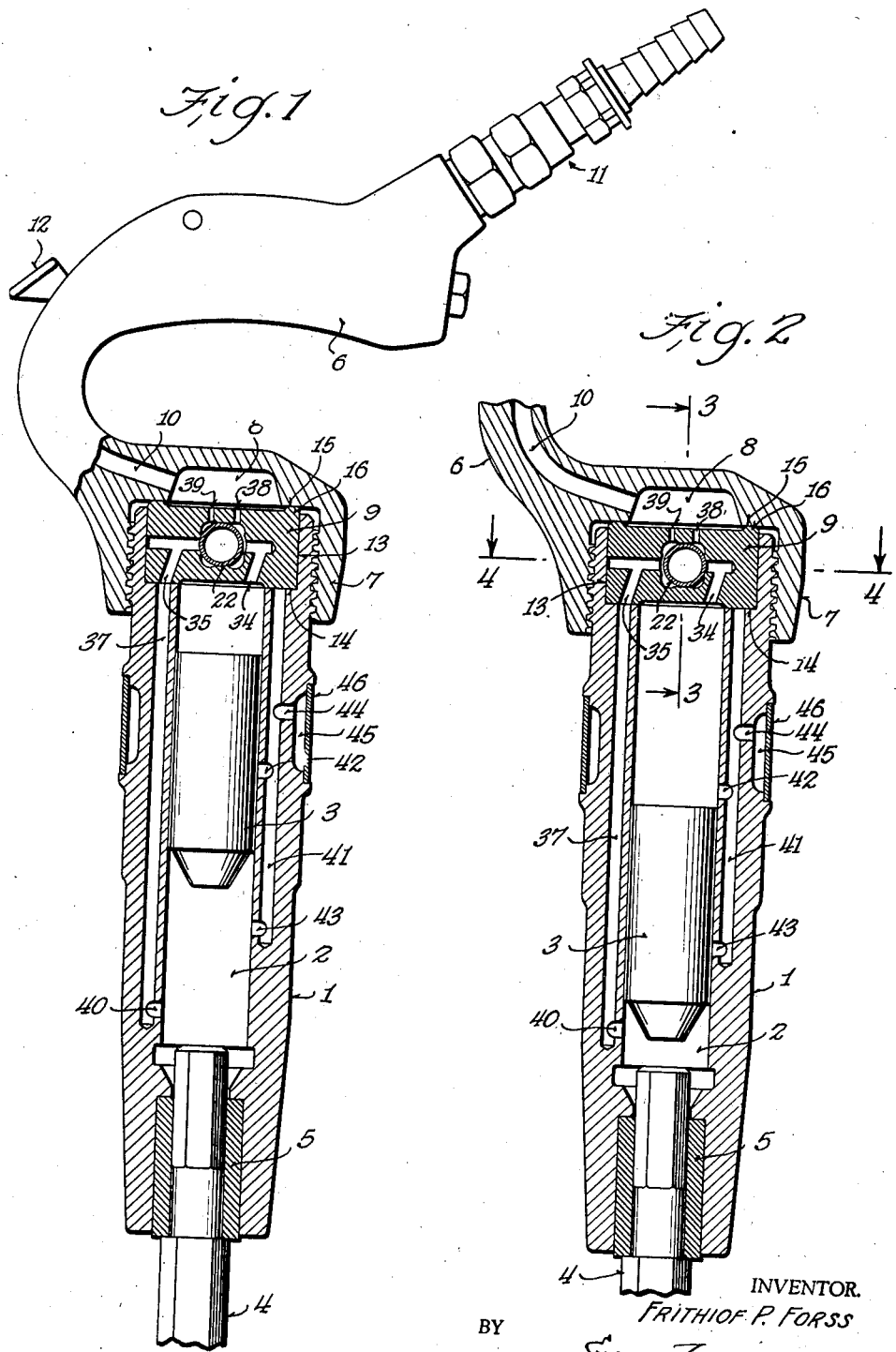

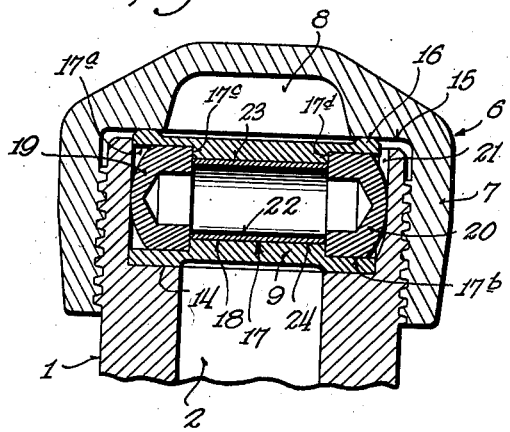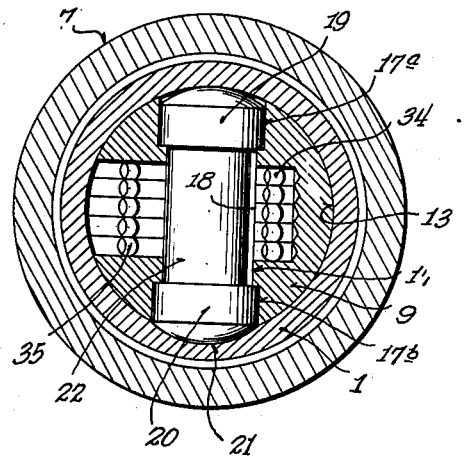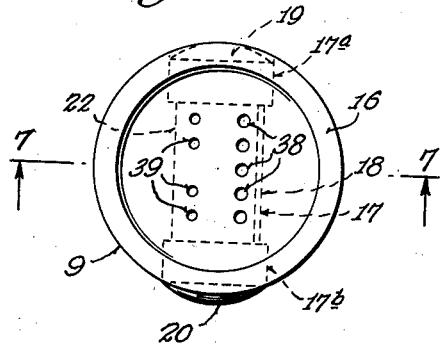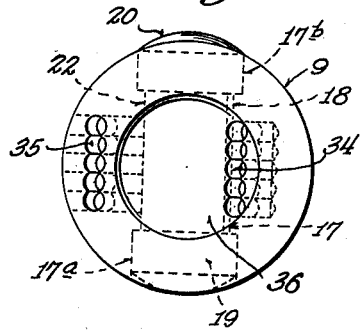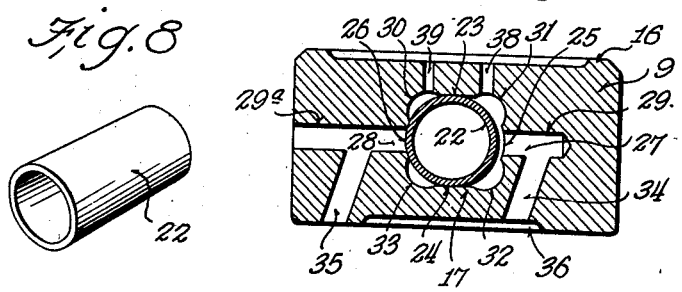

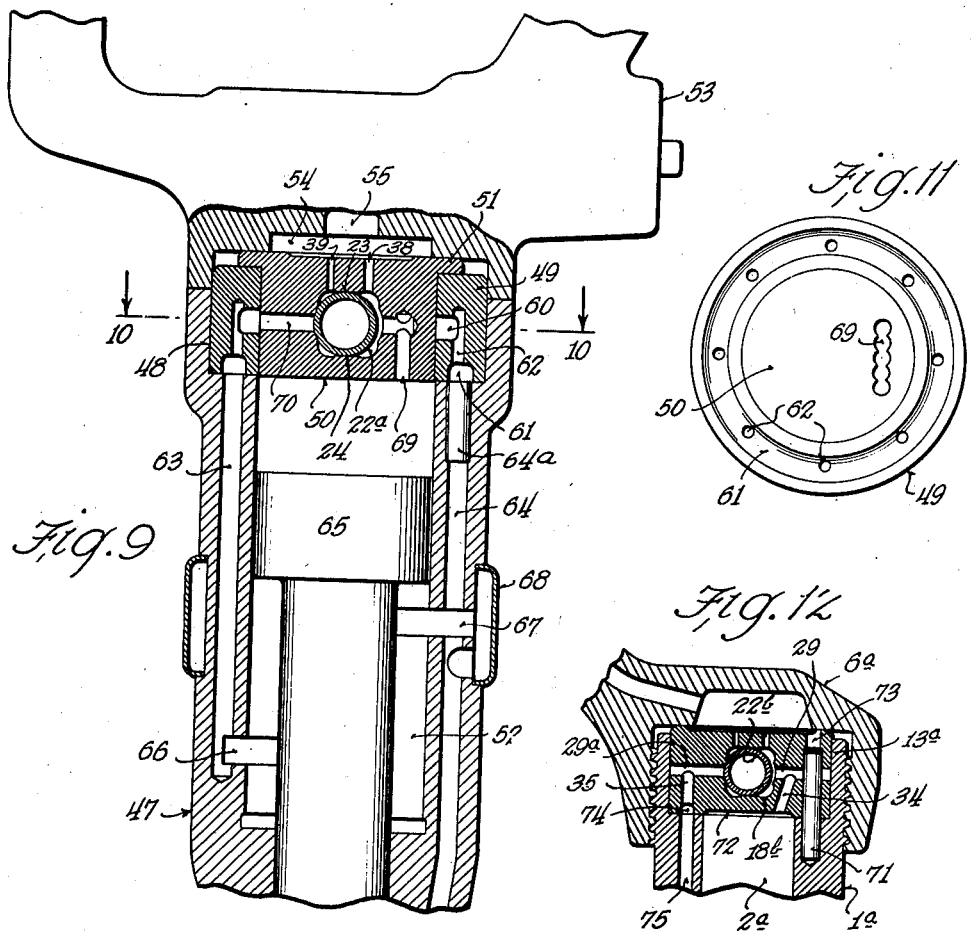
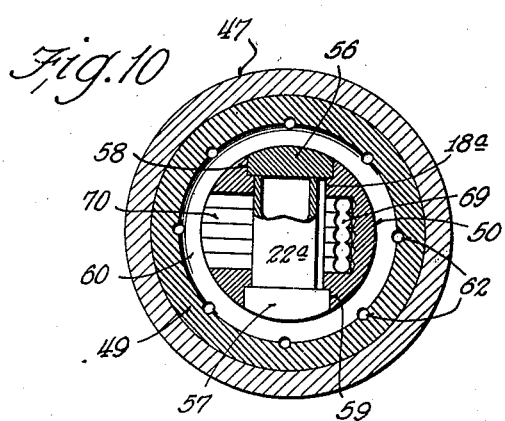
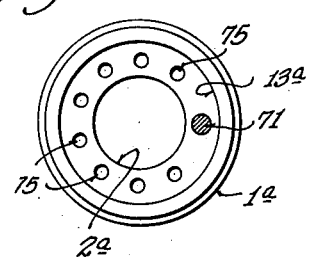

2,334,403

UNITED STATES PATENT OFFICE 2,334,403

DISTRIBUTING VALVE FOR PNEUMATIC HAMMERING TOOLS

Frithiof P. Forss, Aurora, Ill., assignor to Independent Pneumatic Tool Co., Chicago, Ill., a corporation of Delaware Application December 30, 1940, Serial No. 372,227

4 Claims. (Cl. 121—19)

This invention relates to improvements in distributing valves for portable pneumatic hammers and like tools.

The distributing valves heretofore employed in these tools have been of various types. The sleeve and the spool types which depend upon a sliding action for controlling the supply of pressure fluid to the opposite ends of the tool cylinder are subject to friction and wear. This results in leakage and lowers the efficiency of the tool. Small particles of scale, rust or dirt carried into the valve by the compressed air are likely to interfere with the valve action even to the extent of preventing its operation. Even ordinary lubricating oil congealing, due to the lowering of the temperature caused by the expansion of the compressed air, frequently interferes with the free action of these sliding valves because of the sticking produced by the lodgement of the oil on the valve and its seats. Moreover, the repair or upkeep costs on these valves are high on account of the elaborate valve design and the accurate machining necessary.

The plate valve necessitates numerous right angle turns in the air channels of the valve block. This makes the action of the tool sensitive to changes in the air pressure. Moreover, the flat contact surfaces of the plate valve and its seats within the valve block are also sensitive to the lodgement of dirt and the like between them preventing perfect sealing against air leakage.

The rocking valve of the semi-tubular type requires pins or equivalent means to interengage the valve member to center and hold it in its supporting block. Tool vibration from the rapidly hammering strokes of the piston is likely to jar these pins loose and the disintegration which results causes the pins to break.

In accordance with my invention, I overcome the objections referred to by providing a cylindric valve member and mount it in its supporting block for freedom of movement both revolubly and laterally. In this way the valve member in response to the action of the air pressure thereon may shift laterally to alternately open and close the ports which the valve member controls and at the same time turn freely about its axis to reduce wear on the valve member by presenting different portions of its cylindrical surface to the valve seats in the block at said ports and the supports in the block for the valve member and maintain such surfaces and supports free of dirt, rust, scale and congealed oil, if any, by the wiping action which the valve member performs in its revoluble or turning movement. Moreover, the cylindrical valve member enables simple passages to be provided in the block for the direct flow of air pressure therethrough to the tool cylinder. In addition, the cylindric valve member contributes to inexpensive and less complicated machining for the valve member and the bore in the block to mount and retain it.

As to the bore, I make it laterally larger than the diameter of the valve member so that the valve member may shift automatically to change the flow of live air pressure to the opposite ends of the tool cylinder in the operation of the tool and in addition provide the bore at points above and below the valve member with substantially flat and tangential seats to support the valve member within the bore for both lateral and revoluble shifting.

A further object of my invention is to provide the bore at the ports which the valve member serves with seating surfaces on arcs of the same radius as the valve member so that proper sealing can be maintained between the valve member and the block when the valve member closes said ports.

A further object of my invention is to provide the bore with channels located between these valve seats and the valve supports above and below the valve member so that the valve member may be supplied through the bore with air pressure in any shifted position of the valve member within the bore.

A further object of my invention is to close the opposite ends of the bore by plugs, which plugs retain the valve member in its operative position within the bore and which plugs in certain types of tool designs to be hereinafter referred to, may be employed as keying means for centering the valve block with respect to the registerable air flow passages in the tool cylinder.

A further object of my invention is to provide a ring-like type of mounting for the valve block so that the valve action of my invention may be adapted to tools which employ a barrel diameter larger than the valve block per se.

In connection with the last mentioned adaptation, my invention has for its purpose to provide this ring mounting with a channel arrangement which will enable the ports or passages in the valve block to be connected with the ports or passages in the tool cylinder in any rotative position of the valve mounting within the same.

The invention consists further in the features hereinafter described and claimed.

In the accompanying drawings—

Fig. 1 is a longitudinal sectional view with parts in elevation of a portable pneumatic hammer equipped with a distributing valve assembly of my invention, the cylindric valve member being shown in its shifted position for supplying air pressure to the rear end of the tool cylinder;

Fig. 2 is a similar view with the handle member broken away and showing the valve member in its shifted position for furnishing air pressure to the front end of the tool cylinder;

Fig. 3 is a vertical sectional view taken on line 3—3 of Fig. 2;

Fig. 4 is a horizontal sectional view taken on line 4—4 of Fig. 2;

Fig. 5 is a top plan view of the valve assembly removed from the tool;

Fig. 6 is a bottom plan view of said valve assembly;

Fig. 7 is a cross-sectional view taken through the valve assembly on line 7—7 of Fig. 5;

Fig. 8 is a perspective view of the cylindric valve member;

Fig. 9 is a sectional view similar to that of Fig. 1, but showing the form of the valve assembly of my invention when adapted for a larger hammer, as for example, a pneumatically operated clay digger or like tool;

Fig. 10 is a sectional view taken on line 10—10 of Fig. 9;

Fig. 11 is a bottom plan view of the valve assembly of Fig. 9 removed from the tool;

Fig. 12 is a sectional view on a smaller scale like that of Fig. 1, but showing a dowel pin used as a key for the valve block rather than one of the closing plugs as in Fig. 4; and Fig. 13 is a view looking into the rear end of the barrel to show the dowel pin and the longitudinal passages in the barrel for certain of the ports in the valve block.

In the drawings, I have shown my invention applied to two specifically different types of portable pneumatically operated hammering tools. In Figs. 1 to 8 inclusive, the invention is shown applied to a chipping hammer or similar tool, while in Figs. 9 to 11 inclusive, the invention is shown applied to a clay digger or other larger type of pneumatically operated percussive tool. In both embodiments, the fundamental feature of the invention is the same, namely, a valve action which employs a freely revoluble and laterally shiftable cylindric valve member to control the distribution of compressed air to the opposite ends of the tool cylinder for reciprocating the hammering piston therein.

Referring first to Figs. 1 to 8 inclusive: 1 indicates the barrel of the tool and 2 indicates the cylinder which the barrel provides for the reciprocating hammering piston 3. A chisel 4 extends into the cylinder 2 at the front end of the barrel to receive the blows of the piston 3. A bushing 5 is fitted within the front end of the barrel to support the chisel shank as shown.

A handle member 6 is secured to the rear end of the barrel by means of its tubular extension 7 which fits over the barrel and has a screw threaded connection therewith as shown in Figs. 1 and 2. The extension 7 is preferably integral with the handle member and the latter when screwed down on the barrel closes the rear end thereof. The handle member contains a recess or cavity 8 over the rear end of the barrel to furnish the pressure fluid, such as compressed air, to the valve block 9 to be presently described. A live air passage 10 in the handle member 6 connects with the cavity 8 and a nipple fitting 11 at the rear end of the handle for the air supply hose (not shown).

The flow of live air through the passage 10 to the valve block 9 is controlled by a throttle valve (not shown), its operable lever 12 being accessible from the outerside of the handle member as in tools of this character.

The distributing valve assembly of my invention is located at the rear end of the cylinder 2 within a recess 13 provided in the barrel 1 as shown in Figs. 1 and 2. This valve assembly includes the valve block 9 heretofore referred to, and said block is clamped in the recess against a seat 14 at the bottom thereof by the handle member 6 when screwed down on the barrel. The block 9 and the recess 13 are circular, the block conforming to the recess and having peripherial contact with the cylindric wall thereof as shown in Fig. 4. The contacting surfaces between the parts have a ground fit to avoid air leakage.

The block 9 closes the rear end of the cylinder 2 and is held from rotative movement therein by a keying arrangement, two forms of which are shown, one in Figs. 1 to 7, inclusive and the other in Figs. 12 and 13. The block 9 has an axial dimension to extend slightly above the surrounding wall of the barrel 1 so that the handle member 6 may engage the block to clamp it in the recess 13. For this purpose, the handle member has an annular shoulder 15 about cavity 8 and the block 9 has an upwardly extending marginal portion 16 to provide a seat for said shoulder. These parts also have a ground fit. With this arrangement as described, the central portion of the upper surface of the block 9 is left free for direct exposure to the air feed cavity 8.

The block 9 is preferably made of solid metal, such as steel, and is provided with a diametrically disposed bore 17 extending completely through the block from one side to the other, as shown in Figs. 3 to 6 inclusive. The bore 17 has its end portions made somewhat larger in diameter than its mid-portion 18 and circular to provide recesses 17a, 17b to mount closing plugs 19, 20. The recesses 17a, 17b are alike in diameter and provide annular shoulders 17c, 17d at their inner ends constituting seats for the respective plugs 19, 20. The latter are alike in shape and dimension, while the recess 17a is somewhat deeper than the recess 17b. This causes the plug 20 when seated in the recess 17b to project slightly beyond the outer side surface of the block 9 to provide a keying arrangement in the form of structure shown in Figs. 1 to 7.

The outer end of the plug 19 is flush with the outer side surface of the block as shown in Figs. 3 and 4. The recess 13 is provided with an axially extending groove or channel 21 in its side wall at one point in its circumference to receive the projecting end of the plug 20. This holds the block 9 from rotation in the recess 13, and centers the block in respect to the air supply passages in the barrel 1 next to be described. The channel 21 extends through the upper edge of the recess 13 to provide for the insertion of the block 9 into and its removal from said recess.

The mid-portion 18 of the bore 17 accommodates a cylindric valve member 22. This valve member is substantially equal in length to the axial dimension of the mid-portion 18 of the bore and is retained therein by the end plugs 19, 20 as detailed in Figs. 3 and 4. The plugs extend radially inward from the seats 17c, 17d to provide abutting surfaces for the opposed end walls of the valve member. The plugs 19, 20 are held from endwise movement in the block 9 by being pressed against the shoulders 17c, 17d by the outer ends of the plugs contacting the cylindric wall of the recess 13. The valve member 22 is revolubly and slidably mounted within the bore 18 in the manner to be presently described and is made hollow for lightness in weight and ease and speed of operation. In practice there is a slight clearance provided between the valve member and the plugs.

The bore section 18 is milled to provide substantially flat upper and lower supporting surfaces 23, 24 for the valve member 22 and these supports not only extend the full length of the bore 18, but are spaced apart only slightly greater than the outside diameter of the valve member. These supports are substantially tangential to the outer cylindrical surface of the valve member and provide for its free movement within the bore. This movement is not only rotative about the axis of the valve member, but is lateral due to the enlarging of the bore on opposite sides of the supports 23, 24 beyond the diameter of the valve member (see Figs. 1, 2 and 7).

The enlargements just referred to comprise the side portions of the bore and have curved surfaces 25, 26 on arcs of the same radius as the outside diameter of the valve member. Hence, the valve member 22 when in contact with either of these seats closes the ports 27, 28 which open through them. It is to be observed from Fig. 7 in particular, that the curved seats 25, 26 are diametrically disposed and are alternately engaged by the valve member in its lateral shifting back and forth within the bore.

The ports 27, 28 are at the ends of passages 29, 29a drilled into the block 9 from one side thereof and across the bore 18. These borings terminate within the block and have their inner ends closed by the metal of the block. The outer ends of the borings are closed by the side wall of the recess 13 when the block is inserted therein. As shown in Figs. 4 and 6, the passages 29, 29a are in alinement on opposite sides of the bore 18 and are sufficient in number to furnish live air to the valve member 22 along the greater portion of its length. In practice, the passages are parallel and open one into the other along their sides to furnish a relatively large volume of air to the valve member 22.

The bore 18 is further enlarged by the provision of a number of channels 30 to 33 inclusive formed in the block between the supports 23, 24 and the valve seats 25, 26, respectively, as detailed in Fig. 7. These channels enable the block to furnish live air pressure to the bore 18 in any shifted position of the valve member. The channels 30 to 33 also localize the areas of the seats 25, 26 to a relatively small portion of the outer circumference of the valve member so that the greater portion of the valve member is left free for exposure to the air pressure within the tool. It will be noted from Figs. 4 and 7 that the bore 18 between the valve seats 25, 26 is only slightly wider than the diameter of the valve member 22. Hence, the valve member is required to make only an extremely small lateral stroke to open and close the ports 27, 28. The distance the valve member travels is only a small fraction of the radius of the valve member. This results in a very quick acting tool. Coupled with this very short lateral stroke of the valve member is the fact that the channels 30 to 33 are large, extend longitudinally for the full length of the bore 18 and are in pairs above and below the valve member on opposite sides of the valve axis. This provides for a large flow of live air to the bore 18 the instant the valve member shifts to open a port and results in instantaneous starting of the tool to deliver blows as soon as the throttle valve is opened, whether fully or partially. This makes the tool quick and certain in action and easy to control enabling the operator when desired to deliver light blows for light work and heavy blows for heavy work at full power proportionate to the amount of live air admitted to the tool at the throttle valve. The channels are large in that they occupy the greater portion of the circumference of the bore between the valve supports 23, 24 and the valve seats 25, 26 with the longitudinal edges of the channels relatively close to the supports and the valve ports, respectively. Also, as shown in Figs. 4 and 6, the valve ports 27, 28 are elongated longitudinally of the bore 18 and extend for the greater portion of its length to convey the large air flow to the cylinder for instant starting and smooth running of the tool.

The block 9 is provided with additional passages 34, 35. These passages are drilled into the block from its under side, the passage 34 intersecting the passage 29, while the passage 35 intersects the passage 29a. The passage 34 opens through the lower side of the block through a cavity 36 which registers with the rear end of the piston cylinder 2. The other passage 35 opens through the lower surface of the block beyond the cavity 36 in that portion of the block which engages the barrel 1 at the seat 14. The tool barrel 1 has one or more longitudinal passages 37 which register with the passage 35 when the parts are assembled. The passages 34, 35 are made to have substantially the same size as the passages 29, 29a which they respectively intersect so that a full volume of air is supplied to the tool cylinder. The passages 34, 35 are drilled in the same manner as the passages 29, 29a. This is indicated in Figs. 4 and 6.

The air intake openings for the block 9 are marked 38, 39. These openings are drilled into the block from its upper side and connect the cavity 8 with the bore 18 on opposite sides of the upper valve support 23. The ports 38, 39 open into the respective channels 30, 31 and hence live air is supplied to the valve member 22 in either of its shifted positions. The ports 38, 39 comprise the size and number desired for controlling the speed of reciprocation of the hammering piston 2. I might remark at this point that by varying the number and size of these ports, the volume of pressure fluid admitted to the bore 18 may be controlled. Hence, for a small size hammer, the inlet ports would be small in size, while for the larger size hammer the inlet ports would be larger without changing the size of the valve block. This is a decided advantage in tool design in that a valve block of one size may serve different sizes of hammers.

The key arrangement described holds the valve block 9 in position with its passage 35 in register with the barrel passage 37. This passage leads to the front end of the cylinder 2 and there connects with said cylinder by a port 40. The barrel is provided with another passage 41. The upper end of this passage is closed by the lower wall of the valve block when the parts are assembled and is connected into the cylinder 2 by two longitudinally spaced ports 42, 43. Both of these ports are controlled by the piston 3 in its reciprocating movement. The upper port 42 is located approximately mid-way between the ends of the passage 41, while the lower port 43 is at the lower end of this passage as shown in Figs. 1 and 2. The passage 41 constitutes the exhaust passage for the tool and is connected to the atmosphere by a port 44 and an annular channel 45 on the outer side of the barrel 1 behind an exhaust deflector clip 46 as well understood in this art.

The valve assembly shown and described operates as follows: When the parts are positioned as in Figs. 1 and 7, the valve member 22 has been shifted laterally into closing position in respect to the port 26 in the valve block 9. The other port 27 is now open to the live air pressure supplied to the tool through the handle 6. This air pressure enters the rear end of the cylinder 2 through the block passage 34 and the hammer piston 2 is driven forwardly on its power stroke. The front end of the cylinder is at this time connected to the exhaust passage 41 through the port 43. As soon as the piston 3 uncovers the upper port 42 the rear end of the cylinder 2 is now connected with the exhaust passage 41. The forward port 43 is now closed by the piston as shown in Fig. 2. This cuts off the forward end of the cylinder to the exhaust with the result that the air entrapped in the cylinder between the tool shank 4 and the forward end of the piston is compressed in the continued forward movement of the piston. This compressed air is forced into the passage 37 towards the valve block 9 through the port 40. Due to the fact that the side of the valve member 22 facing the port 27 is now under a reduced pressure because of the rear end of the cylinder being open to the atmosphere through the exhaust, the force of the air compressed by the piston on its forward stroke will operate through the passage 35 and the port 28 to shift the valve member 22 laterally towards the right as shown in Fig. 2. This is aided by the live air pressure which is on the surface of the valve member facing the port 28 and the valve member is shifted across the bore to close the port 27. The port 28 is now open and live air pressure will be admitted to the front end of the cylinder through the passage 37 and its port 40 to drive the piston rearwardly on its return stroke.

As soon as the piston uncovers the forward port 43, the rear port 42 is closed and the rear end of the cylinder is cut-off from the exhaust, while the forward end of the cylinder is connected to the exhaust. The air entrapped at the rear end of the cylinder is compressed by the rearwardly moving piston and such compressed air acts against the valve member 22 through the port 27 to shift the valve member with the aid of the live air pressure towards the left to open the port 27 and close the port 28. The valve member is now positioned as shown in Fig. 1 and live air pressure is again admitted to the rear end of the cylinder 2 to drive the piston forwardly. These operations repeat in the alternate shifting of the valve member 22 by the action of the air pressure thereon. The volume of air admitted to the bore 18 through the inlet ports 38, 39 is controlled by the combined area of said ports.

In connection with the foregoing, it will be observed from Figs. 1, 2, 5 and 7 that the ports 38 are larger and greater in number than the ports 39. The purpose of this is to supply a greater volume of air to the tool cylinder on the power stroke of the piston than on its return stroke. The point is that the ports for the power stroke have a greater combined area than the ports for the return stroke. This may be accomplished within the drilling limitations in the relatively tough steel used for the valve block by making the ports for the power stroke side slightly larger and greater in number than the ports for the return stroke. As depicted in Fig. 5, the ports 38, 39 are distributed along the length of the bore 18 so as to furnish live air all along the valve member 22. This arrangement locates the ports 38, 39 within the circumference of the valve block for direct connection at their outer ends with the supply passage in the handle 6 and direct connection at their inner ends with the channels 30, 31 in transverse relation to the latter for supplying live air to the bore 18 transversely of its longitudinal axis. In this way, the ports 38, 39 constitute the sole inlet means for the bore and the entire valve assembly may be fitted within the barrel at the rear end of the cylinder and in axial alinement therewith to be clamped in place by the handle and be housed within and protected by the barrel.

Referring now to Figs. 9 to 11 inclusive:

In this embodiment the valve action as previously described is the same, but the construction makes possible the adaptation of this valve action to the larger types of hammering tools, for example clay spades or clay diggers. In tools of this character, the barrel marked 47 in Fig. 9 is considerably larger in diameter than the barrel 1 of the chipping hammer shown in the previous figures. This larger barrel increases the diameter of the recess (marked 48) at the inner end of the barrel to seat the distributing valve assembly. Because of this, the valve assembly is constructed of two interfitting parts as follows:

The outer part 49 which seats in the recess 48 is in the form of an annulus or ring and serves as a mounting for the inner part 50 which constitutes the valve block. The valve block 50 has a radial extension 51 at its upper end to overhang the ring 49 and support the block within the ring as shown in Fig. 9. The handle member 53 of the tool is secured to the rear end of the barrel 47 by side bolts or other desired means and seats against the flange 51 on the valve block 50 to hold the latter and the supporting ring 49 in place in the tool.

The handle member 53 is provided with an air supply cavity 54 over the block 50 and this cavity connects with an air supply passage 55 within the handle unit. This in effect is similar to the construction shown in Fig. 1. It is to be understood that the handle member 53 is provided with a manually operable throttle valve and has means whereby the air supply hose may be connected to the supply passage 55 as in tools of this character.

The valve block 50 is provided with a bore having a section 18a of the same design as the bore in the valve block 9. This bore mounts a cylindric valve member 22a similar to the corresponding valve member in the block 9. The action of the valve member 22a is exactly the same as the action of the valve member 22 and where the structural parts are alike corresponding reference characters are employed. The differences between the two forms, in addition to those already pointed out, are as follows:

The plugs 56, 57 which close the opposite ends of the bore 18a and their recesses 58, 59 are uniform in axial dimension. This enables the outer ends of the plugs 56, 57 to be flush with the outer cylindrical surface of the valve block 50 where it fits within the supporting ring 49. In this arrangement, it is not necessary to hold the valve block 50 against rotative displacement within the ring mounting 49 because the ring mounting is constructed to connect the pressure supply passages of the block with the barrel passages in any rotative position of the mounting within the recess 48. This construction will now be described.

As shown in Figs. 9 and 10, the mounting 49 is provided with an annular channel 60 and this channel is connected at a number of points above its circumference with an annular groove 61 in the bottom surface of the mounting 49 by passages 62, 62. The groove 61 faces the bottom of the recess 48 in which the ring member 49 seats and connects with the several longitudinal passages 63 provided in the barrel 47 as detailed in Fig. 9. The passages 63 are sufficient in number to furnish the desired volume of air to the tool cylinder 52 for reciprocating the hammering piston 65 therein. The passages 63 are connected by a port 66 with the forward end of the cylinder 52 beneath the piston element 65 while one or more passages 64, also in the cylinder 52, are connected by a port 67 with the intermediate part of the cylinder. The port 67 connects with the atmosphere behind an exhaust deflector clip 68 as in tools of this design. Also, as in tools of this character, the passage or passages 64 when drilled through the inner end of the cylinder 52 are closed by a plug 64a in Fig. 9, to close the inner end of the passage to the air supply channel 61.

The valve block 50 is provided with two sets of passages on opposite sides of the valve member 22a in somewhat the same manner as shown in Figs. 1 to 7 inclusive. The passage 69 which connects the bore 18a with the inner end of the cylinder 52 opens through the bottom surface of the block 50 over said cylinder. The passage 70 connects the opposite side of the bore 18a with the annular channel 60, said channel opening on the inside of the ring mounting 49 as shown. In this arrangement, it is apparent that the passage 70 in the valve block is connected with the channel 60 in any rotative position of the valve block within its mounting 49, and as before stated, the annular groove 61 connects the passages 70 with the barrel passages 63 in any rotative position of the ring 49 in the recess 48. With this arrangement, no keying connection is required and hence production time and machining costs are reduced because there is no need for making a groove in the barrel for either of the plugs 56, 57.

The advantage of the disclosure in Figs. 9 and 10 is that the valve action of my invention is adaptable to the larger and more powerful tools in that the mounting 49 makes possible the insertion of the valve action in tools having a barrel diameter greater than the valve block per se.

In Fig. 12 I have shown a form of my invention in which a dowel pin 71 is employed for centering the valve block 72 and holding it against rotative movement within the tool assembly. The construction illustrated is similar to that shown in Figs. 1 to 8 with the exception that the plugs which close the opposite ends of the bore 18b are terminated flush with the outer cylindrical surface of the valve block 71 as shown in Figs. 9 and 10. Otherwise, the valve action for the construction is the same as shown in Figs. 1 to 8. The valve block 72 seats within a recess 13a at the inner end of the barrel 1a and is clamped in place by handle member 6a screwed on the barrel as shown in Fig. 12.

The dowel pin 71 is anchored in the barrel 1a and enters a bore 73 provided in the valve block to receive the pin. The valve member 22b is similar to the valve 22 previously shown and described.

The valve block 72 is provided on its underside with an annular channel 74 and this channel serves all of the longitudinal passages 75, 75 located in the barrel 1a for supplying the desired air volume to the forward end of the barrel cylinder 2a.

In all of the forms, as before stated, the valve action is the same. The advantages of a freely revoluble and laterally shifting cylindrical valve member are as follows: No pins or equivalent means to break or jar loose are required to hold the valve member in place or hinder its free lateral and rotative movement. Friction and wear are practically eliminated because of the valve member being cylindrical and free to revolve presents different portions of its cylindrical surface to the valve supports 23, 24 and to the valve seats 25, 26. This distributes the wear on the valve member all around its circumferential surface and in addition makes the entire outer surface of the valve member a valve surface. Moreover, with the valve member freely revoluble the travel of the valve member about its axis keeps the valve seats and the supports clean and free of dust, dirt, rust and congealed oil, if any, by a wiping action and the proper sealing can be maintained which is so essential to effective tool operation. Added to this is the fact that cylindrical form of the valve member renders it effective in any position in which the tool may be held, and with the seats and supports for the valve member kept clean sticking is prevented which contributes to quick starting and rapid valve action. Also, the construction has the advantage of being simple and comprised of but a few parts which keeps the upkeep and repair down. The cylindric valve member also contributes to a simple porting and passage arrangement in the block for the direct flow of air therethrough and lower costs in production and machining. The valve member is preferably made of a steel relatively harder than that of the block to provide for ease in the valve action and durability of the parts. All contacting surfaces are ground to avoid air leakage.

The details of construction and arrangement of parts shown and described may be variously changed and modified without departing from the spirit and scope of my invention, except as pointed out in the annexed claims.

I claim as my invention:

1. In a pneumatic hammering tool, a barrel containing a cylinder, a hammering piston therein, a valve block located in the barrel at one end of the cylinder and having a bore extending therethrough in crossing relation to the cylinder, said bore having opposed valve seats and valve supports therebetween intermediate the ends of the bore, ports connecting the bore at the valve seats to the opposite ends of the cylinder, a cylindrical distributing valve member located within the bore and operable by the fluid pressure supplied to the cylinder through the bore, said valve member being slidably and rotatably supported with the bore by said valve supports for movement into and out of contact with the valve seats to alternately open and close the ports to reciprocate the piston within the cylinder, plug elements closing the opposite ends of the bore and held therein by contact with the adjacent surrounding wall of the barrel, at least one of said plug elements having a keying connection with the barrel for centering and holding the valve block from rotation therein, an exhaust for the cylinder, and inlet ports in the valve block connected to the bore for supplying pressure fluid thereto.

2. In a pneumatic hammering tool, a barrel containing a cylinder, a hammering piston therein, a valve block located in said barrel at one end of the cylinder and having a bore extending therethrough in crossing relation to the cylinder, said bore having opposed valve seats and valve supports therebetween intermediate the ends of the bore, ports connecting the bore at the valve seats to the opposite ends of the cylinder, plug elements closing the opposite ends of the bore and held therein by contact with the adjacent surrounding wall of the barrel, at least one of said plug elements extending beyond the valve block and interfitting in a channel in the barrel to center and hold the valve block from rotation therein, a cylindrical distributing valve member located within the bore between said plug elements and operable by the pressure fluid supplied to the cylinder through the bore, said valve member being slidably and rotatably supported in the bore by the valve supports for lateral shifting into and out of contact with the valve seats to alternately open and close the ports to reciprocate the piston within the cylinder, an exhaust for the cylinder, and inlet ports in the valve block connected to the bore for supplying pressure fluid thereto.

3. In a portable pneumatic hammering tool, a cylinder, a piston therein, a valve block at one end of the cylinder and having a bore having opposed valve seats and valve supports therebetween, ports connecting the bore at the valve seats to the opposite ends of the cylinder, a hollow cylindrical distributing valve member rotatably and slidably mounted within the bore on the valve supports, said bore between the valve seats being only slightly wider than the diameter of the valve member for the lateral shifting thereof by the pressure fluid supplied to the cylinder through the bore, the lateral travel of the valve member being only a small fraction of the radius of the valve member to alternately open and close said ports rapidly to reciprocate the piston within the cylinder, said valve supports being tangential to the valve member and the valve seats being on the same radius as the valve member, said block being provided independently of the valve member with channels opening into the bore between the valve supports and the valve seats for supplying pressure fluid to the bore in any shifted position of the valve member, said channels extending longitudinally of the bore in pairs above and below the valve member on opposite sides of the valve axis and occupying the greater portion of the circumference of the bore between the valve supports and the valve seats with the longitudinal edges of the channels relatively close to the supports and the ports, respectively, to provide large channels, whereby a small shifting motion of the valve member to open a port results in a large flow of pressure fluid from a pair of channels to the adjacent port for instantaneous starting of the tool, said ports being elongated and extending longitudinally of the valve member for the greater portion of its axial length to convey the large flow of pressure fluid from the bore to the cylinder, an exhaust for the cylinder, and inlet passages in the block connected to one of the channels of each pair intermediate the ends thereof for supplying pressure fluid to the bore transversely of the valve axis.

4. In a portable pneumatic hammering tool, a barrel providing a cylinder, a piston reciprocable therein on its power and return strokes, a valve block clamped in the barrel at one end of the cylinder and having a bore extending cross-wise of the cylinder and provided with opposed valve seats and valve supports therebetween, ports connecting the bore at the valve seats to the opposite ends of the cylinder, a hollow cylindrical distributing valve member rotatably and slidably mounted within the bore on the valve supports, said bore between the valve seats being only slightly wider than the diameter of the valve member for the lateral shifting thereof by the pressure fluid supplied to the cylinder through the bore, the lateral shifting of the valve member being only a small fraction of the radius of the valve member to alternately open and close said ports rapidly to reciprocate the piston within the cylinder, said valve supports being tangential to the valve member and the valve seats being on the same radius as the valve member, said block being provided independently of the valve member with channels opening into the bore between the valve supports and the valve seats for supplying pressure fluid to the bore in any shifted position of the valve member, said channels extending longitudinally of the bore for substantially the full length of the valve member and disposed in pairs above and below the valve member on opposite sides of the valve axis, said channels occupying the greater portion of the circumference of the bore between the valve supports and the valve seats with the longitudinal edges of the channels relatively close to the supports and the seats, respectively, to provide large channels, whereby a small shifting of the valve member to open a port results in a large flow of pressure fluid from a pair of channels to the adjacent port for instantaneous starting of the tool, said ports being elongated and extending longitudinally of the bore for the greater portion of its length as occupied by the valve member to convey the large flow of pressure fluid to the cylinder, an exhaust for the cylinder, and inlet ports in the block connected to one of the channels of each pair intermediate the ends thereof for supplying pressure fluid to the bore transversely of the valve axis, said inlet ports being arranged in groups for the respective channels with the individual ports of one group smaller than the ports of the other group and having the combined area of the inlet ports for the power stroke of the piston greater than the combined area of the inlet ports for the return stroke of the piston.

FRITHIOF P. FORSS.